US012792565B2

(12) United States Patent
Cai

(10) Patent No.: US 12,792,565 B2
(45) Date of Patent: Nov. 10, 2026

(54) METHOD FOR INDEX DATA PROCESSING, METHOD FOR INDEX GENERATION, MEDIUM AND DEVICE

(71) Applicant: Beijing Volcano Engine Technology Co., Ltd., Beijing (CN)

(72) Inventor: Shu Cai, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/882,619

(22) Filed: Sep. 11, 2024

(65) Prior Publication Data

US 2025/0110923 A1 Apr. 3, 2025

(30) Foreign Application Priority Data

Sep. 28, 2023 (CN) ......................... 202311279423.7

(51) Int. Cl.
*G06F 16/13* (2019.01)

(52) U.S. Cl.
CPC .................................. *G06F 16/137* (2019.01)

(58) Field of Classification Search
CPC .............................. G06F 16/137; Y02D 10/00
See application file for complete search history.

(56) References Cited

U.S. PATENT DOCUMENTS

2019/0146978 A1* 5/2019 Beedgen ................ G06F 17/40
707/754

FOREIGN PATENT DOCUMENTS

CN 114968922 A 8/2022

* cited by examiner

*Primary Examiner* — Tyler J Torgrimson
(74) *Attorney, Agent, or Firm* — BakerHostetler

(57) ABSTRACT

The present disclosure relates to a method for processing index data, a method for index generation, a medium and a device. The method for processing index data includes: in response to data being written into a data table, obtaining index data corresponding to target data written in the data table, the index data is data corresponding to an index field used for constructing an index in the target data; determining a target log queue and a target index log file into which each of the index data is to be written based on a log queue corresponding to the data table; and writing the index data corresponding to the target data into the target index log file in the target log queue.

13 Claims, 2 Drawing Sheets

METHOD FOR INDEX DATA PROCESSING, METHOD FOR INDEX GENERATION, MEDIUM AND DEVICE

CROSS-REFERENCE TO RELATED APPLICATION

The present application claims the priority and benefits of Chinese Patent Application No. 202311279423.7, filed on Sep. 28, 2023, which is incorporated herein by reference in its entirety as part of the present application.

TECHNICAL FIELD

Embodiments of the present disclosure relates to a method for processing index data, a method for index generation, a medium and a device.

BACKGROUND

In a database system, it is necessary to generate indexes for data during write operations, allowing users to perform data inquiry. However, in scenarios with significant scale and heavy loads, both the index generation and write processes can result in increased delays in index writing, thereby causing user query delays.

SUMMARY

This Summary section is provided to introduce concepts in a brief form, which will be described in detail in the Detailed Description section later. This Summary section is not intended to identify key features or essential features of the claimed technical scheme, nor is it intended to limit the scope of the claimed technical scheme.

The present disclosure provides a method for processing index data, in which the method includes:

- in response to data being written into a data table, obtaining index data corresponding to target data written in the data table, in which the index data is data corresponding to an index field used for constructing an index in the target data;
- determining a target log queue and a target index log file into which each of the index data is to be written based on a log queue corresponding to the data table, in which a plurality of index log files are stored under each log queue, and a plurality of index data are stored in each index log file; and
- writing the index data corresponding to the target data into the target index log file in the target log queue, in which the index log file is a write-ahead log (WAL) file, and the index log file is used for data playback to generate an index corresponding to the index data.

The present disclosure provides a method for index generation, in which the method includes:

- determining a log queue to be processed corresponding to an index log file to be processed, in which the index log file is generated based on the method for processing index data described above;
- obtaining the index log file from the log queue to be processed; and
- performing data playback based on index data in the index log file to generate an index corresponding to the index data.

The present disclosure provides an apparatus for processing index data, in which the apparatus includes:

- a first acquisition module is configured to in response to data being written into a data table, obtain index data corresponding to target data written in the data table, in which the index data is data corresponding to an index field used for constructing an index in the target data;
- a first determination module is configured to determine a target log queue and a target index log file into which each of the index data is to be written based on a log queue corresponding to the data table, a plurality of index log files are stored under each log queue, and a plurality of index data are stored in each index log file; and
- a first processing module is configured to write the index data corresponding to the target data into the target index log file in the target log queue, in which the index log file is a WAL file, and the index log file is used for data playback to generate an index corresponding to the index data.

The present disclosure provides an apparatus for index generation, in which the apparatus includes:

- a fourth determination module is configured to determine a log queue to be processed corresponding to an index log file to be processed, the index log file is generated based on the method for processing index data described above;
- a second acquisition module is configured to obtain the index log file from the log queue to be processed; and
- a generation module is configured to perform data playback based on index data in the index log file to generate an index corresponding to the index data.

The present disclosure provides a computer-readable medium on which a computer program is stored, in which the program, when executed by a processor, implements the steps of the method described above.

The present disclosure provides an electronic device, in which the electronic device includes:

- a memory for storing computer programs; and
- a processor, configured to execute the computer programs in the memory to implement the steps of the method described above.

In the above technical scheme, when data are written into the data table, the index data corresponding to the target data written into the data table are obtained, and then the target log queue and the target index log file into which each of the index data is to be written are determined based on the log queue corresponding to the data table, so that the index data are written into the target index log file in the target log queue. The index log file is used for data playback to generate the index corresponding to the index data. Based on this scheme, the index data may be obtained and stored during data writing, so as to ensure the accurate generation of the index, effectively address the processing efficiency of index data for large-scale datasets, and avoid the problem of index loss after power failure. At the same time, in this technical scheme, load balancing control may be performed on the data writing process based on the log queue during the process of writing the index data into the index log file, thus providing support for realizing the writing balance of the index data, ensuring the efficiency of subsequent processing of the index data in the index log file, facilitating the improvement of the efficiency of index generation, and reducing index writing delays and user query delays.

BRIEF DESCRIPTION OF DRAWINGS

With reference to the accompanying drawings and the following detailed description, the above and other features, advantages and aspects of embodiments of the present disclosure will become more apparent. Throughout the drawings, the same or similar reference numerals indicate the same or similar elements. It should be understood that the drawings are schematic, and elements are not necessarily drawn to scale. In the drawings.

DETAILED DESCRIPTION

Figure 1:
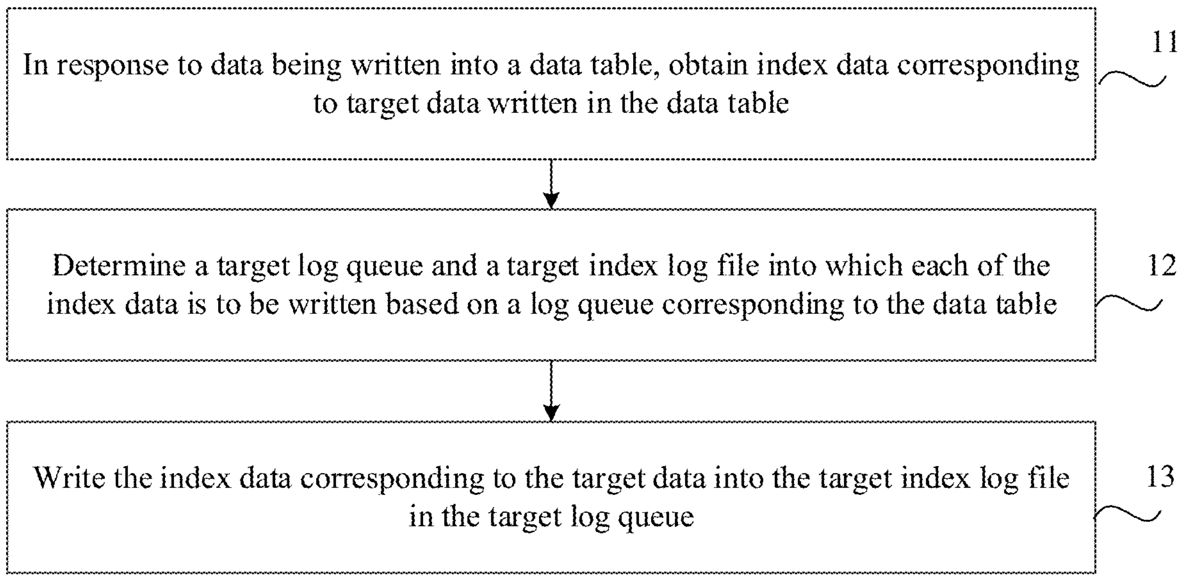
FIG. 1 is a flowchart of a method for processing index data according to an implementation mode of the present disclosure.

Embodiments of the present disclosure will be described in more detail below with reference to the drawings. While certain embodiments of the present disclosure are shown in the drawings, it should be understood that the present disclosure may be embodied in various forms and should not be construed as limited to the embodiments set forth herein. Rather, these embodiments are provided for understanding the present disclosure more thoroughly and completely. It should be understood that the drawings and embodiments of the present disclosure are only for exemplary purposes, and are not intended to limit the protection scope of the present disclosure.

It should be understood that various steps recorded in the implementation modes of the method of the present disclosure may be performed according to different orders and/or performed in parallel. In addition, the implementation modes of the method may include additional steps and/or omit the illustrated steps. The scope of the present disclosure is not limited in this aspect.

The term “including” and variations thereof used in this article are open-ended inclusion, namely “including but not limited to”. The term “based on” refers to “at least partially based on”. The term “one embodiment” means “at least one embodiment”; the term “another embodiment” means “at least one other embodiment”; and the term “some embodiments” means “at least some embodiments”. Relevant definitions of other terms may be given in the description hereinafter.

The concepts such as “first”, “second”, etc. mentioned in the present disclosure are only used to distinguish different devices, modules or units, and are not used to limit the order of functions performed by these devices, modules or units or interdependence relationship.

The modifications of “a” and “a plurality of” mentioned in the present disclosure are illustrative rather than restrictive, and those skilled in the art should understand that unless the context clearly indicates otherwise, they should be understood as “one or more”.

The names of messages or information exchanged between multiple devices in the embodiments of the present disclosure are only for illustrative purposes, and are not intended to limit the scope of these messages or information.

It can be understood that before using the technical schemes disclosed in several embodiments of the present disclosure, users should be informed of the types, scope of use and usage scenarios of personal information involved in the present disclosure in an appropriate way in accordance with relevant laws and regulations, and user authorization is required.

For example, in response to receiving a proactive request from a user, a prompt message is sent to the user, explicitly stating that the operation the user requested will necessitate obtaining and utilizing the user’s personal information, so that the user can decide whether to provide personal information to software or hardware such as electronic devices, applications, servers or storage media that perform the operation of the technical scheme of the present disclosure according to the prompt message.

As an alternative and non-restrictive implementation mode, in response to receiving the proactive request from the user, the way to send the prompt message to the user can be, for example, in the form of a pop-up window, in which the prompt message can be presented in text. In addition, the pop-up window can also include selection controls “agree” and “disagree” for the user to choose regarding the provision of personal information to electronic devices.

It can be understood that the above notification and user authorization procedures are illustrative and do not limit the implementation modes of the present disclosure. Other methods that comply with relevant laws and regulations may also be applied in the implementation modes of the present disclosure.

It can be understood that the data involved in this technical scheme (including but not limited to the data itself, data acquisition or use) shall comply with the requirements of corresponding laws and regulations.

FIG. 1 is a flowchart of a method for processing index data according to an implementation mode of the present disclosure. As shown in FIG. 1, the method may include the following steps.

In step 11, in response to data being written into a data table, obtain index data corresponding to target data written in the data table. The index data is data corresponding to an index field used for constructing an index in the target data.

The data table may be a table used for data writing in a storage system, such as student table and class table in an educational administration system, which may be preset or specified according to the actual application scenario to determine a data table requiring real-time index generation. The written data are data written to the data table in the storage system.

As an example, an index field for constructing an index may be set according to actual index needs. Suppose the data table is a student table, where a field may include name, student number, class, age, etc. To construct an index for name, the index field may be set as a name field. Accordingly, when data are written into the data table, data corresponding to the index field may be obtained as the index data, that is, a data value under the name field in the written data may be obtained. In this step, when the original data are written into the data table in the storage system, data corresponding to a pre-configured index field may be obtained, so that the index data in the written data can be written into a log file for subsequent index generation, thus avoiding the issue of index loss due to power failure after the original data are written.

In step 12, determine a target log queue and a target index log file into which each of the index data is to be written based on a log queue corresponding to the data table. A plurality of index log files are stored under each log queue, and a plurality of index data are stored in each index log file.

The log queue is used for storing index log files, and may also include metadata of the index log files. In the process of distributed index data processing, data producers may write index data into an index log file and store the same in a corresponding log queue, while data consumers may access the corresponding log queue to obtain the index log file from the log queue, and construct an index based on the index data in the index log file. The number of log queues may be set based on actual application scenarios.

In this embodiment, there may be multiple data tables and log queues, and accordingly, log queues corresponding to each data table may be set in advance. For example, the log queues may be allocated according to the data processing capacity corresponding to each data table. In response to the existence of eight log queues, namely Q0-Q7, initially, log queues Q0-Q4 are allocated to the data table T1, log queues Q5 and Q6 are allocated to the data table T2, and log queue Q7 is allocated to the data table T3-T6. When data are written into the data table T1, index data may be obtained from the written data, a target log queue may be determined from the log queues Q0-Q4 corresponding to the data table T1, and a target index log file under the target log queue may be further determined.

In step 13, write the index data corresponding to the target data into the target index log file in the target log queue. In which the index log file is a write-ahead log (WAL) file, and the index log file is used for data playback to generate an index corresponding to the index data. The WAL file implements a data playback mechanism to ensure that backups of all unwritten index data are found in the WAL file, thus ensuring the integrity of the index data.

In this embodiment, after being extracted, the index data corresponding to the target data written into the data table may be written into a file under the log queue corresponding to the data table, thus achieving balanced processing of index data across different data tables. The target index log file into which the index data need to be written is further determined, so as to realize the balanced processing of index data in different index log files when the index data are written, that is, the index data are allocated in the production process of the index data.

In the above technical scheme, when data are written into the data table, the index data corresponding to the target data written into the data table are obtained, and then the target log queue and the target index log file into which each of the index data is to be written are determined based on the log queue corresponding to the data table, so that the index data are written into the target index log file in the target log queue. The index log file is used for data playback to generate the index corresponding to the index data. Based on this scheme, the index data may be obtained and stored during data writing, so as to ensure the accurate generation of the index, effectively address the processing efficiency of index data for large-scale datasets, and avoid the problem of index loss after power failure. At the same time, in this technical scheme, load balancing control may be performed on the data writing process based on the log queue during the process of writing the index data into the index log file, thus providing support for realizing the writing balance of the index data, ensuring the efficiency of subsequent processing of the index data in the index log file, facilitating the improvement of the efficiency of index generation, and reducing index writing delays and user query delays.

In one possible embodiment, the exemplary implementation of determining a target log queue and a target index log file into which each of the index data is to be written based on a log queue corresponding to the data table may include:

perform a hash operation on the index data to obtain a hash value of the index data; and determine the target log queue according to the hash value and the log queue corresponding to the data table.

The hash value may be obtained by utilizing a commonly used hashing approach in this field. As an example, the number of log queues corresponding to the data table may be obtained, which is denoted as hashShard, and the target log queue may be determined by performing modulo operation on the number of log queues corresponding to the target data table based on the hash value. In response to the log queue corresponding to the data table are Q0, Q1 and Q2 and their modulo values are 0, 1, 2 respectively, then when the modulo value of the hash is 1 after applying modulo 3, Q1 may be taken as the target log queue for the indexed data, that is, the indexed data are written into the index log file under the Q1 directory. Performing the hash operation on the index data in this step facilitates the balanced allocation of index data across log queues for processing, and also enables the binding association between the index data and the target log queue through the hash operation, aiding in subsequent data playback and query processes.

Further, the target index log file may be determined according to the hash value, the target log queue and attribute information corresponding to the index data.

Each log queue may correspond to one shard, representing a directory of a group of index log files, and there may be multiple index log files under this directory. Then, a file corresponding to the index data may be further determined from the index log files in the target log queue in this step.

As an example, an identifier of the target log queue may be encoded in directory information, so as to allow for direct querying based on the identifier of the target log queue during the query process, thereby enhancing data query efficiency.

In one possible embodiment, to facilitate quick querying of the index log file, the following information may be encoded in a file name of the index log file:

tableId, which is used to represent a table identifier of the data table corresponding to the index data;

columnId, which is used to represent a field identifier of an index field corresponding to the index data;

hashId/hashShard, hashShard is used to represent the number of log queues corresponding to the data table to which the index data belong, hashId is used to represent a value obtained by performing modulo operation on the number of log queues based on the hash value of the indexed data, and the determination of hashId allowing for balanced writing of the index data into different log queues, thus improving the load balance of index data processing; and uuid, which may be realized by random numbers and is not repeated, thus ensuring that the names of each index log file will not conflict.

To construct a time series index, the file name may also include timeBucket, which is used to represent the time series index, so as to identify the time period information to which the index data belong, that is, the time interval in which the index data are located.

Accordingly, in one possible embodiment, the attribute information corresponding to the index data includes at least one selected from a group consisting of a table identifier of the data table, a field identifier corresponding to the index data, and time period information to which the index data belong.

Accordingly, determine the target index log file according to the hash value, the target log queue and attribute information corresponding to the index data includes:

perform modulo operation on a number of log queues corresponding to the target data table based on the hash value, to obtain a modulo value corresponding to the index data. The implementation of this step has been described in detail above and will not be repeated here.

Then, determine a log file in the target log queue corresponding to queue identifier information and the attribute information as the target index log file, the queue identifier information includes the modulo value and a number of the log queue corresponding to the data table.

The file name of the index log file may be determined in the way as described above, then when determining the index log file corresponding to the index data, the corresponding target index log file may be directly determined from the target log queue based on the queue identifier information and attribute information; in response to a handle of the corresponding file being retrieved based on the above information, the index data may be written into the target index log file; and in response to a handle of the corresponding file not being retrieved based on the above information, the file name may be determined based on the above information, the target index log file is created, and the index data are written into the target index log file, so as to facilitate the subsequent query process of the generated index and improve the index query efficiency.

Therefore, through the above technical scheme, the index data can be hashed, thereby providing data support for the balanced processing of the index data, ensuring the load balance in the process of generating the index data, and improving the real-time performance of index generation. At the same time, the binding between the index data and the target log queue allows the information corresponding to the same index to be processed by the same log queue, so that in the subsequent query process based on the generated index, the query can be directly made from the index corresponding to the target log queue corresponding to the index data, which effectively reduces the data access volume during data queries and improves the data query efficiency.

In one possible embodiment, the method further includes:

determine data write duration corresponding to the target index log file.

In this way, the file name of the target index log file to be written may be determined, and then the handle of the target index log file may be opened to write the index data into the target index log file. As an example, a suffix of the target index log file into which data are being written may be set to .irs_tmp, indicating that the file supports data writing.

In this embodiment, in order to ensure the real-time performance of index generation, each index log file may be set to record index data in a certain time period. Based on this, in this embodiment, data write duration corresponding to the index log file may be obtained, starting from the opening time of the handle of the target index log file.

Then, in response to the data write duration reaching preset duration, update a type of the target index log file to a completion type, a file of the completion type is a file in which data is no longer written.

The preset duration may be set according to the actual application scenario. For example, in a scenario with high index real-time requirement, the preset duration may be set short, and in a scenario with low index real-time requirement, the preset duration may be set long. It should be noted that after the type of the index log file is updated to the completion type, the index log file may be accessed by subsequent processing nodes for data playback to generate an index.

As an example, update the type of the target index log file to the completion type may be renaming the suffix of the target index log file to .irs (index raw segment). This type of file does not support append writing, thereby enabling the index log file to be added by no further updated data to be appended and written to the file. This guarantees the accuracy and integrity of index data processing, preventing any data omission during index generation based on the indexed log file, and ensuring the accuracy and effectiveness of index generation.

In practical application scenarios, the index log files are usually written in a distributed way, so the number of the index log files is large but the data volume is small. When the index log files are directly dumped as indexes, it may result in smaller index files, necessitating the merging of indexes in the future. Based on this, the present disclosure provides the following embodiment.

In one possible embodiment, the method may further include:

group a plurality of index log files under the log queue to obtain a plurality of file groups, index log files in each file group correspond to the same target attribute information, and the target attribute information including a queue identifier of the target log queue, a table identifier of the data table and a field identifier of an index field corresponding to the index data. Here, the table identifier may be a table name or an Id of the data table, and the field identifier may be a field name or a field Id, which may be set in advance, which is not limited by the present disclosure.

For each log queue, the file group may be determined by scanning the index log files. In this embodiment, by grouping index log files with the same target attribute information, it is possible to group index log files for index data of the same field within the same table in the same log queue. As shown above, index log files with the same tableId, columnId, HashId/hashShard may be grouped, where hashId/hashShard represents a queue identifier of the target log queue, indicating which of the multiple queues corresponding to the data table the target log queue is.

As another example, in response to the name of the index log file also including timeBucket, the index log files may be further grouped based on tableId, columnId, hashId/hashShard and timeBucket to obtain multiple file groups.

For each of the file groups, a plurality of index log files under the file group are merged to obtain a merged index log file, and then index generation may be performed based on the merged index log file when data playback is performed later to generate an index.

As an example, the contents of each index log file under this file group may be directly spliced and merged to obtain the merged index log file, and a suffix of the merged index log file may be updated to .Irm (index raw merge). In subsequent index generation, a corresponding index may be generated for each file with the suffix irm, ensuring the comprehensiveness and completeness of the indexes generated from the index log files within the same group. This in turn improves the efficiency of data queries based on the generated indexes, making it convenient for users to perform queries.

As another example, the size of the index log file will also affect the subsequent index generation efficiency, so a data volume threshold of the index log file may be set in advance, and accordingly, each index log file under the file group may be merged from front to back in turn according to a completion time of the index log file, while ensuring that a data volume of the merged index log file is less than the data volume threshold. In response to the data volume after merging the index log file X1 exceeding the data volume threshold, the index log files before X1 may be merged to obtain a merged index log file, and the merging will continue from X1 onwards until all index log files under the file group are merged.

According to the above technical scheme, the index log files may be further grouped, so that the index log files belonging to the same file group are merged. This reduces the number of files requiring index dumping, thus improving the efficiency of index generation. Further, it eliminates the need for secondary index merging processes when generating indexes directly from the index log files, thus ensuring the validity of the generated indexes and enhancing the efficiency of data queries based on the indexes.

In one possible embodiment, the method may further include:

determine a data volume of data written into each data table in a target time period.

The target time period may be set based on the actual application scenario, such as setting it as the day closest to the current time. This allows for the accumulation of data volume when writing data into the data table, thereby determining the volume of data written into the data table during this target time period.

The data volume is sent to a scheduler, enabling the scheduler to determine a log queue corresponding to the each data table based on a received data volume corresponding to each data table.

After receiving the volume of data written into each data table in the target time period, the scheduler dynamically adjusts the number of log queues corresponding to each data table according to the real-time data volume. For example, the log queues corresponding to each data table may be determined using the logic of averaging data volume processed by each log queue. In response to the existence of eight log queues, namely Q0-Q7, initially, log queues Q0-Q4 are allocated to the data table T1, log queues Q5 and Q6 are allocated to the data table T2, and log queue Q7 is allocated to the data table T3-T6.

In this embodiment, based on the volume of data written into the data tables T1-T6 in the target time period, the ratio of data volumes of T1, T2 and T3-T6 is determined to be 4:3:1, and then the number of logs corresponding to the data tables T1 and T2 may be further adjusted. For example, four log queues may be allocated to the data table T1, three log queues are allocated to the data table T2, and one log queue is allocated to the data table T3-T6.

For the each data table, a received log queue corresponding to the each data table sent by the scheduler is determined as a new log queue corresponding to the each data table.

Then, in response to receiving a message sent by the scheduler, the log queues corresponding to each data table may be determined according to the allocation status of log queues sent by the scheduler most recently, and then the target log queue into which the corresponding index data are written may be determined from the new log queues corresponding to the data table.

Therefore, through the above technical scheme, the dynamic allocation of the log queue corresponding to the data tables is realized based on the data volume of data written into each data table in the recent time period, ensuring the matching degree between the log queues and the data writing process of the data tables, and guaranteeing that the data volumes of the index data written into each log queue are approximately the same to a certain extent, so that the load balance during index data processing is ensured, delays in processing the index data of some data tables caused by uneven allocation of the log queues are avoided, the real-time performance of index generation is improved, and the user experience is enhanced.

The present disclosure further provides a method for index generation, which may include:

determine a log queue to be processed corresponding to an index log file to be processed, the index log file is generated based on any index data processing method as described above; and obtain the index log file from the log queue to be processed.

Here, data in multiple log queues may be processed by multiple processing nodes, and the log queue corresponding to each processing node may be determined in a pre-configured manner. In this embodiment, a log queue to be processed corresponding to a current processing node may be determined based on configuration information, and a corresponding index log file may be obtained from the log queue to be processed.

As an example, scheduling of processing nodes and log queues may be achieved by a scheduler. For example, the scheduler detects a processing node list through heartbeat or Consul, so as to determine the processing nodes that can consume the data in the log queues, and then the same number of log queues are allocated to each processing node according to the total number of log queues, that is, the log queues to be processed corresponding to each processing node are determined.

As an example, in response to the format of the index log file being irs, the index log files may be merged based on the above-mentioned merging method to obtain a merged index log file, such as a file with irm format. Then, index generation processing is performed based on the merged index log file.

Data playback is performed based on index data in the index log file to generate an index corresponding to the index data.

As an example, in this step, the index generation may be performed by data playback, and an index may be constructed by means of a structure such as a B+ tree using a construction method commonly used in the field, which will not be further elaborated here.

Therefore, through the above technical scheme, the index log file to be processed can be obtained from the corresponding log queue to be processed, so that the load balance in the process of index generation is ensured to a certain extent through the scheduling of the log queues, the efficiency of index generation is improved, user query delays are reduced, and the user experience is improved.

During actual system operation, various factors may cause the originally balanced load between nodes to become unbalanced, such as a sudden increase in index flow corresponding to certain data tables, or different computing capacities between processing nodes corresponding to a log queue to be processed, leading to some processing nodes experiencing unusually high loads; additionally, malfunctioning of a processing node may also cause disruptions to the log queue it consumes, resulting in delays. Based on this, the present disclosure also provides the following embodiments. Specifically, the method may further include:

in response to a data volume corresponding to the log queue to be processed exceeding a processing threshold, obtain data volumes corresponding to other log queues than the log queue to be processed.

The processing threshold may be set based on the processing performance of the processing node corresponding to the log queue to be processed. In the present disclosure, the data volume corresponding to the log queue to be processed exceeding the processing threshold means that there is a risk of overload in the processing of the processing node corresponding to the log queue to be processed. In this case, the data volumes corresponding to other log queues may be obtained, so as to determine the load status of other log queues.

A scheduling log queue is determined according to the data volume corresponding to the log queue to be processed and the data volumes corresponding to other log queues.

As an example, in response to the existence of an idle queue in the system, when it is determined that the data volume of one of the other log queues is 0, the other log queues may be directly determined as the scheduling log queue. As another example, one of the other log queues with the smallest data volume may be obtained, and when the data volume corresponding to the other log queues is less than the data volume corresponding to the log queue to be processed, the other log queues may be determined as the scheduling log queue. As another example, the processing node corresponding to each log queue may determine its corresponding processing load based on its data volume and its own processing performance, in this embodiment, one of the other log queues with the smallest corresponding processing load may be obtained, and when the processing load corresponding to the other log queues is less than that corresponding to the log queue to be processed, the other log queues may be determined as the scheduling log queue.

At least part of index log files in the log queue to be processed are moved to the scheduling log queue, that is, this part of index log files are stored in the scheduling log queue for processing.

As an example, index log files with data volumes exceeding the processing threshold in the log queue to be processed may be moved to the scheduling log queue for processing. As another example, mean processing may also be performed according to the data volume corresponding to the log queue to be processed and the data volume corresponding to the scheduling log queue, so as to determine the index log files in the log queue to be processed that need to be moved to the scheduling log queue.

Therefore, through the above technical scheme, the scheduling of index log files in multiple log queues is realized, and when the index volume of a log queue is unbalanced or the data volume of a log queue is overloaded due to some external reasons, at least part of the index log files in the overloaded log queue may be moved to other idle queues, so that delays are quickly eliminated, thus addressing write delays caused by unbalanced load of processing nodes in the process of distributed index generation, and further improving the efficiency of index generation.

Figure 2:
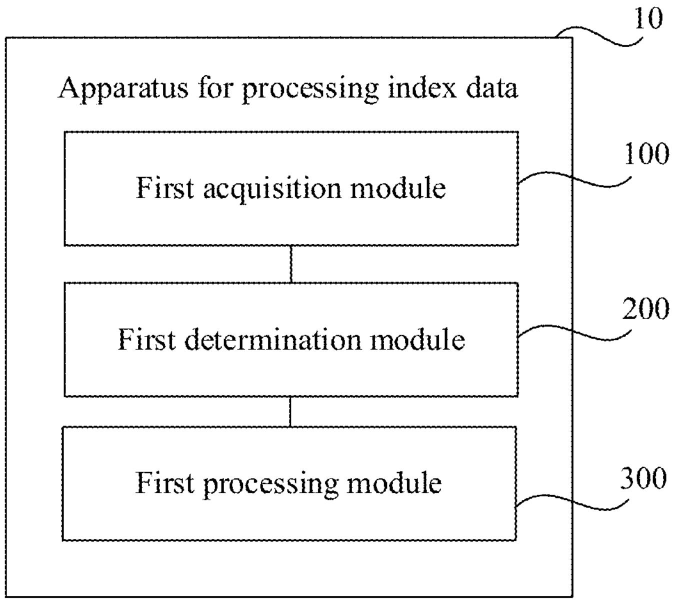
FIG. 2 is a block diagram of an apparatus for processing index data according to an implementation mode of the present disclosure.

The present disclosure further provides an apparatus for processing index data, as shown in FIG. 2, the apparatus for processing index data 10 includes: a first acquisition module 100, a first determination module 200 and a first processing module 300.

The first acquisition module 100 is configured to in response to data being written into a data table, obtain index data corresponding to target data written in the data table, in which the index data is data corresponding to an index field used for constructing an index in the target data.

The first determination module 200 is configured to determine a target log queue and a target index log file into which each of the index data is to be written based on a log queue corresponding to the data table, a plurality of index log files are stored under each log queue, and a plurality of index data are stored in each index log file.

The first processing module 300 is configured to write the index data corresponding to the target data into the target index log file in the target log queue, in which the index log file is a WAL file, and the index log file is used for data playback to generate an index corresponding to the index data.

Optionally, the first determination module includes: a first processing submodule, a first determination submodule and a second determination submodule.

The first processing submodule is configured to perform a hash operation on the index data to obtain a hash value of the index data.

The first determination submodule is configured to determine the target log queue according to the hash value and the log queue corresponding to the data table.

The second determination submodule is configured to determine the target index log file according to the hash value, the target log queue and attribute information corresponding to the index data.

Optionally, the attribute information corresponding to the index data includes at least one selected from the group consisting of a table identifier of the data table, a field identifier of an index field corresponding to the index data, and time period information to which the index data belong; and the second determination submodule includes: a second processing submodule and a third determination submodule.

The second processing submodule is configured to perform a modulo operation on a number of log queues corresponding to the target data table based on the hash value, to obtain a modulo value corresponding to the index data.

The third determination submodule is configured to determine a log file in the target log queue corresponding to queue identifier information and the attribute information as the target index log file, in which the queue identifier information includes the modulo value and a number of the log queue corresponding to the data table.

Optionally, the apparatus for processing index data further includes: a second determination module and a first update module.

The second determination module is configured to determine data write duration corresponding to the target index log file.

The first update module is configured to in response to the data write duration reaching preset duration, update a type of the target index log file to a completion type, in which a file of the completion type is a file in which data is no longer written.

Optionally, the apparatus for processing index data further includes: a second processing module and a merging module.

The second processing module is configured to group a plurality of index log files under the log queue to obtain a plurality of file groups, in which index log files in each file group correspond to the same target attribute information, and the target attribute information includes a queue identifier of the target log queue, a table identifier of the data table and a field identifier of an index field corresponding to the index data.

The merging module is configured to, for each of the file groups, merge a plurality of index log files under the each of the file groups to obtain a merged index log file.

Optionally, the apparatus for processing index data further includes: a third determination module, a sending module and a second update module.

The third determination module is configured to determine a data volume of data written into each data table in a target time period.

The sending module is configured to send the data volume to a scheduler, enable the scheduler to determine a log queue corresponding to the each data table based on a received data volume corresponding to each data table.

The second update module is configured to, for the each data table, determining a received log queue corresponding to the each data table sent by the scheduler as a new log queue corresponding to the each data table.

The present disclosure further provides an apparatus for index generation, the apparatus includes: a fourth determination module, a second acquisition module and a generation module.

The fourth determination module is configured to determine a log queue to be processed corresponding to an index log file to be processed, the index log file is generated based on the method for processing index data as described above.

The second acquisition module is configured to obtain the index log file from the log queue to be processed.

The generation module is configured to perform data playback based on index data in the index log file to generate an index corresponding to the index data.

Optionally, the apparatus for index generation further includes: a third acquisition module, a fifth determination module and a third processing module.

The third acquisition module is configured to in response to a data volume corresponding to the log queue to be processed exceeding a processing threshold, obtain data volumes corresponding to other log queues than the log queue to be processed.

The fifth determination module is configured to determine a scheduling log queue according to the data volume corresponding to the log queue to be processed and the data volumes corresponding to other log queues.

The third processing module is configured to move at least part of index log files in the log queue to be processed to the scheduling log queue.

Figure 3:
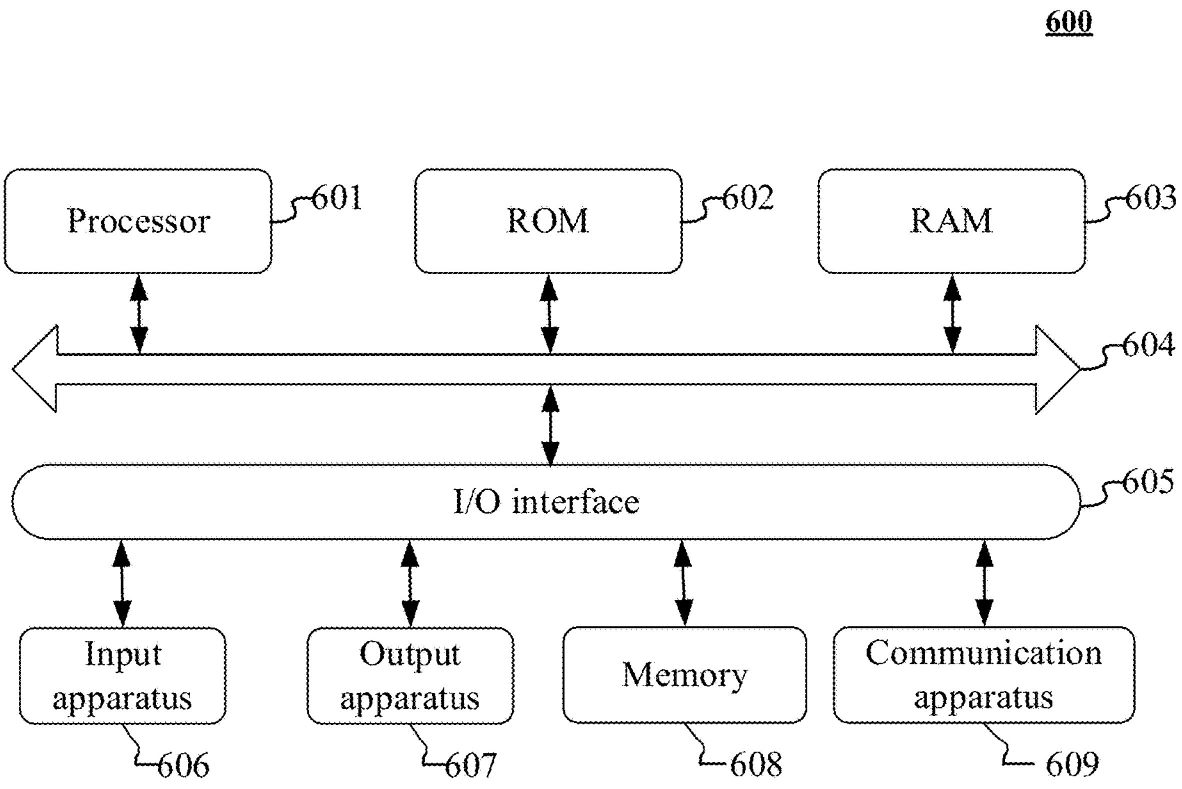
FIG. 3 is a structural diagram of an electronic device suitable for implementing the embodiments of the present disclosure.

Referring to FIG. 3, it is a structural diagram of an electronic device (for example, terminal device or server) 600 suitable for implementing the embodiments of the present disclosure. The terminal device in the embodiments of the present disclosure may include but not limited to mobile terminals such as mobile phones, notebook computers, digital broadcast receivers, personal digital assistants (PDA), portable android devices (PAD), portable multimedia players (PMP), and vehicle-mounted terminals (such as vehicle-mounted navigation terminals), and fixed terminals such as digital TV and desktop computers. The electronic device shown in FIG. 3 is only an example, and should not impose any limitations on the functionality and scope of use of the embodiments of the present disclosure.

As shown in FIG. 3, the electronic device 600 may include a processor (such as a central processing unit, and a graphics processor) 601, it may execute various appropriate actions and processes according to a program stored in a read-only memory (ROM) 602 or a program loaded from a memory 608 to a random access memory (RAM) 603. In RAM 603, various programs and data required for operations of the electronic device 600 are also stored. The processor 601, ROM 602, and RAM 603 are connected to each other by a bus 604. An input/output (I/O) interface 605 is also connected to the bus 604.

The following apparatuses may be connected to the I/O interface 605: an input apparatus 606 such as a touch screen, a touchpad, a keyboard, a mouse, a camera, a microphone, an accelerometer, and a gyroscope; an output apparatus 607 such as a liquid crystal display (LCD), a loudspeaker, and a vibrator; a memory 608 such as a magnetic tape, and a hard disk drive; and a communication apparatus 609. The communication apparatus 609 may allow the electronic device 600 to wireless-communicate or wire-communicate with other devices so as to exchange data. Although FIG. 3 shows the electronic device 600 with various apparatuses, it should be understood that it is not required to implement or possess all the apparatuses shown. Alternatively, it may implement or possess the more or less apparatuses.

In particular, according to the embodiment of the present disclosure, the process described above with reference to the flow diagram may be achieved as a computer software program. For example, an embodiment of the present disclosure includes a computer program product, it includes a computer program loaded on a non-transient computer-readable medium, and the computer program includes a program code for executing the method shown in the flow diagram. In such an embodiment, the computer program may be downloaded and installed from the network by the communication apparatus 609, or installed from the memory 608, or installed from ROM 602. When the computer program is executed by the processor 601, the above functions defined in the method in the embodiments of the present disclosure are executed.

The above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not be limited to: an electric connector with one or more wires, a portable computer magnetic disk, a hard disk drive, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that includes or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, a client and a server may be communicated by using any currently known or future-developed network protocols such as a HyperText Transfer Protocol (HTTP), and may interconnect with any form or medium of digital data communication (such as a communication network). Examples of the communication network include a local region network ("LAN"), a wide region network ("WAN"), an internet work (such as the Internet), and an end-to-end network (such as an ad hoc end-to-end network), as well as any currently known or future-developed networks.

The above-described computer-readable medium may be included in the above-described electronic device, or may also exist alone without being assembled into the electronic device.

The above-described computer-readable medium carries one or more programs that, when executed by the electronic device, cause the electronic device to: obtain index data corresponding to written data in a data table; determine a target log queue and index log files corresponding to each of the index data based on log queues corresponding to the data table; and write the index data into the index log files in the target log queue, the index log file is a WAL file, and the index log file is used for data playback to generate an index corresponding to the index data.

Alternatively, the above-described computer-readable medium carries one or more programs that, when executed by the electronic device, cause the electronic device to: determine a log queue to be processed corresponding to an index log file to be processed, the index log file is generated based on the method for processing index data as described above; obtain the index log file from the log queue to be processed; and perform data playback based on index data in the index log file to generate an index corresponding to the index data.

The computer program code for executing the operation of the present disclosure may be written in one or more programming languages or combinations thereof, the above programming language includes but not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code includes one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The modules involved in the embodiments of the present disclosure can be realized by software or hardware. In certain cases, the name of a module does not constitute a limitation on the module itself. For example, the first acquisition module may also be described as "a module that, in response to data being written into a data table, acquires index data corresponding to target data written in the data table".

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a visible medium, and it may include or store a program for use by or in combination with an instruction executive system, apparatus, or device. The machine-readable medium may be a machine-readable signal medium or a machine-readable storage medium. The machine-readable medium may include but is not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

According to one or more embodiments of the present disclosure, Example 1 provides a method for processing index data, in which the method for processing index data includes:

in response to data being written into a data table, obtaining index data corresponding to target data written in the data table, in which the index data is data corresponding to an index field used for constructing an index in the target data;

determining a target log queue and a target index log file into which each of the index data is to be written based on a log queue corresponding to the data table, in which a plurality of index log files are stored under each log queue, and a plurality of index data are stored in each index log file; and writing the index data corresponding to the target data into the target index log file in the target log queue, in which the index log file is a write-ahead log (WAL) file, and the index log file is used for data playback to generate an index corresponding to the index data.

According to one or more embodiments of the present disclosure, Example 2 provides the method of Example 1, in which the determining a target log queue and a target index log file into which each of the index data is to be written based on a log queue corresponding to the data table, includes:

performing a hash operation on the index data to obtain a hash value of the index data;

determining the target log queue according to the hash value and the log queue corresponding to the data table; and determining the target index log file according to the hash value, the target log queue and attribute information corresponding to the index data.

According to one or more embodiments of the present disclosure, Example 3 provides the method of Example 2, in which the attribute information corresponding to the index data includes at least one selected from the group consisting of a table identifier of the data table, a field identifier of an index field corresponding to the index data, and time period information to which the index data belong; and determining the target index log file according to the hash value, the target log queue and attribute information corresponding to the index data, includes:

performing a modulo operation on the number of log queues corresponding to the target data table based on the hash value, to obtain a modulo value corresponding to the index data; and determining a log file in the target log queue corresponding to queue identifier information and the attribute information as the target index log file, in which the queue identifier information includes the modulo value and the number of the log queue corresponding to the data table.

According to one or more embodiments of the present disclosure, Example 4 provides the method of Example 1, in which the method for processing index data further includes:

determining data write duration corresponding to the target index log file; and in response to the data write duration reaching preset duration, updating a type of the target index log file to a completion type, in which a file of the completion type is a file in which data is no longer written.

According to one or more embodiments of the present disclosure, Example 5 provides the method of Example 1, in which the method for processing index data further includes:

grouping a plurality of index log files under the log queue to obtain a plurality of file groups, in which index log files in each file group correspond to the same target attribute information, and the target attribute information includes a queue identifier of the target log queue, a table identifier of the data table and a field identifier of an index field corresponding to the index data; and for each of the file groups, merging a plurality of index log files under the each of the file groups to obtain a merged index log file.

According to one or more embodiments of the present disclosure, Example 6 provides the method of Example 1, in which the method for processing index data further includes:

determining a data volume of data written into each data table in a target time period;

sending the data volume to a scheduler, enabling the scheduler to determine a log queue corresponding to the each data table based on a received data volume corresponding to each data table; and for the each data table, determining a received log queue corresponding to the each data table sent by the scheduler as a new log queue corresponding to the each data table.

According to one or more embodiments of the present disclosure, Example 7 provides a method for index generation, in which the index generation method includes:

determining a log queue to be processed corresponding to an index log file to be processed, in which the index log file is generated based on the method for processing index data according to any one of Examples 1-6;

obtaining the index log file from the log queue to be processed; and performing data playback based on index data in the index log file to generate an index corresponding to the index data.

According to one or more embodiments of the present disclosure, Example 8 provides the method of Example 7, in which the index generation method further includes:

in response to a data volume corresponding to the log queue to be processed exceeding a processing threshold, obtaining data volumes corresponding to other log queues than the log queue to be processed;

determining a scheduling log queue according to the data volume corresponding to the log queue to be processed and the data volumes corresponding to other log queues; and moving at least part of index log files in the log queue to be processed to the scheduling log queue.

According to one or more embodiments of the present disclosure, Example 9 provides an apparatus for processing index data, in which the apparatus includes: a first acquisition module, a first determination module and a first processing module.

The first acquisition module is configured to in response to data being written into a data table, obtain index data corresponding to target data written in the data table, in which the index data is data corresponding to an index field used for constructing an index in the target data.

The first determination module is configured to determine a target log queue and a target index log file into which each of the index data is to be written based on a log queue corresponding to the data table, a plurality of index log files are stored under each log queue, and a plurality of index data are stored in each index log file.

The first processing module is configured to write the index data corresponding to the target data into the target index log file in the target log queue, in which the index log file is a WAL file, and the index log file is used for data playback to generate an index corresponding to the index data.

According to one or more embodiments of the present disclosure, Example 10 provides an apparatus for index generation, in which the apparatus for index generation includes: a fourth determination module, a second acquisition module and a generation module.

The fourth determination module is configured to determine a log queue to be processed corresponding to an index log file to be processed, the index log file is generated based on the method for processing index data according to any one of Examples 1-6.

The second acquisition module is configured to obtain the index log file from the log queue to be processed.

The generation module is configured to perform data playback based on index data in the index log file to generate an index corresponding to the index data.

According to one or more embodiments of the present disclosure, Example 11 provides a computer-readable medium on which a computer program is stored, in which the program, when executed by a processor, implements the steps of the method according to any one of Examples 1-8.

According to one or more embodiments of the present disclosure, Example 12 provides an electronic device, in which the electronic device includes: a memory and a processor.

The memory for storing computer programs.

The processor is configured to execute the computer programs in the memory to implement the steps of the method according to any one of Examples 1-8.

The above are only preferred embodiments of the present disclosure and the explanation of the applied technical principles. It should be understood by those skilled in the art that the disclosure scope involved in the present disclosure is not limited to the technical scheme formed by the specific combination of the above technical features, but also covers other technical schemes formed by any combination of the above technical features or their equivalent features without departing from the above disclosure concept, such as a technical scheme formed by mutual replacement of the above-mentioned features and technical features with similar functions disclosed in the present disclosure (but not limited thereto).

Further, although the operations are depicted in a particular order, this should not be understood as requiring that these operations be performed in the particular order shown or in a sequential order. Under certain circumstances, multitasking and parallel processing may be beneficial. Likewise, although several specific implementation details are contained in the above discussion, these should not be construed as limiting the scope of the present disclosure. Some features described in the context of separate embodiments can also be combined in a single embodiment. On the contrary, various features described in the context of a single embodiment can also be implemented in multiple embodiments individually or in any suitable sub-combination.

Although the subject matter has been described in language specific to structural features and/or methodological actions, it should be understood that the subject matter defined in the appended claims is not necessarily limited to the specific features or actions described above. On the contrary, the specific features and actions described above are only exemplary forms of implementing the claims. With regard to the apparatus in the above embodiment, the specific way in which each module performs operations has been described in detail in the embodiment of the method, which will not be repeated here.

The invention claimed is:

1. A method for improving processing of index data, comprising:

in response to first data being written into a data table, obtaining second data corresponding to the first data written in the data table, wherein the second data is index data corresponding to an index field used for constructing an index in the first data;

determining a log queue and an index log file into which each of the index data is to be written based on a log queue corresponding to the data table, wherein a plurality of index log files are stored under each log queue, and wherein a plurality of index data are stored in each index log file; and writing the index data corresponding to the first data into the index log file in the log queue, wherein the index log file is a write-ahead log (WAL) file that is used for data playback to generate an index corresponding to the index data after the first data has already been written into the table, thereby ensuring that generation of the index does not interfere with the writing of the first data into the table.

2. The method according to claim 1, wherein determining a log queue and an index log file into which each of the index data is to be written based on a log queue corresponding to the data table, comprises:

performing a hash operation on the index data to obtain a hash value of the index data;

determining the log queue according to the hash value and the log queue corresponding to the data table; and determining the index log file according to the hash value, the log queue and attribute information corresponding to the index data.

3. The method according to claim 2, wherein the attribute information corresponding to the index data comprises at least one selected from a group consisting of a table identifier of the data table, a field identifier of an index field corresponding to the index data, and time period information to which the index data belong; and wherein the determining the index log file according to the hash value, the log queue and attribute information corresponding to the index data, comprises:

performing a modulo operation on a number of log queues corresponding to the data table based on the hash value, to obtain a modulo value corresponding to the index data; and determining a log file in the log queue corresponding to queue identifier information and the attribute information as the index log file, wherein the queue identifier information comprises the modulo value and a number of the log queue corresponding to the data table.

4. The method according to claim 1, further comprising:

determining data write duration corresponding to the index log file; and in response to the data write duration reaching preset duration, updating a type of the index log file to a completion type, wherein a file of the completion type is a file in which data is no longer written.

5. The method according to claim 1, further comprising:

grouping a plurality of index log files under the log queue to obtain a plurality of file groups, wherein index log files in each file group correspond to a same attribute information, and the attribute information comprises a queue identifier of the log queue, a table identifier of the data table and a field identifier of an index field corresponding to the index data; and for each of the file groups, merging a plurality of index log files under the each of the file groups to obtain a merged index log file.

6. The method according to claim 1, further comprising:

determining a data volume of data written into each data table in a time period;

sending the data volume to a scheduler, enabling the scheduler to determine and send a log queue corresponding to the each data table based on a received data volume corresponding to each data table; and for the each data table, determining a received log queue corresponding to the each data table sent by the scheduler as a new log queue corresponding to the each data table.

7. A non-transitory computer-readable medium on which a computer program is stored, wherein the program, when executed by a processor, implements the steps of the method for processing index data according to claim 1.

8. An electronic device, comprising:

a memory for storing computer programs; and a processor, configured to execute the computer programs in the memory to implement the steps of a method for processing index data, and the method comprises:

in response to first data being written into a data table, obtaining second data corresponding to the first data written in the data table, wherein the second data is index data corresponding to an index field used for constructing an index in the first data;

determining a log queue and an index log file into which each of the index data is to be written based on a log queue corresponding to the data table, wherein a plurality of index log files are stored under each log queue, and wherein a plurality of index data are stored in each index log file; and writing the index data corresponding to the first data into the index log file in the log queue, wherein the index log file is a write-ahead log (WAL) file that is used for data playback to generate an index corresponding to the index data after the first data has already been written into the table, thereby ensuring that generation of the index does not interfere with the writing of the first data into the table.

9. The electronic device according to claim 8, wherein determining a log queue and a index log file into which each of the index data is to be written based on a log queue corresponding to the data table, comprises:

performing a hash operation on the index data to obtain a hash value of the index data;

determining the log queue according to the hash value and the log queue corresponding to the data table; and determining the index log file according to the hash value, the log queue and attribute information corresponding to the index data.

10. The electronic device according to claim 9, wherein the attribute information corresponding to the index data comprises at least one selected from a group consisting of a table identifier of the data table, a field identifier of an index field corresponding to the index data, and time period information to which the index data belong; and determining the index log file according to the hash value, the log queue and attribute information corresponding to the index data, comprises:

performing a modulo operation on a number of log queues corresponding to the data table based on the hash value, to obtain a modulo value corresponding to the index data; and determining a log file in the log queue corresponding to queue identifier information and the attribute information as the index log file, wherein the queue identifier information comprises the modulo value and a number of the log queue corresponding to the data table.

11. The electronic device according to claim 8, wherein the method for processing index data further comprises:

determining data write duration corresponding to the index log file; and in response to the data write duration reaching preset duration, updating a type of the index log file to a completion type, wherein a file of the completion type is a file in which data is no longer written.

12. The electronic device according to claim 8, wherein the method for processing index data further comprises:

grouping a plurality of index log files under the log queue to obtain a plurality of file groups, wherein index log files in each file group correspond to a same attribute information, and the attribute information comprises a queue identifier of the log queue, a table identifier of the data table and a field identifier of an index field corresponding to the index data; and for each of the file groups, merging a plurality of index log files under the each of the file groups to obtain a merged index log file.

13. The electronic device according to claim 8, wherein the method for processing index data further comprises:

determining a data volume of data written into each data table in a time period;

sending the data volume to a scheduler, enabling the scheduler to determine and send a log queue corresponding to the each data table based on a received data volume corresponding to each data table; and for the each data table, determining a received log queue corresponding to the each data table sent by the scheduler as a new log queue corresponding to the each data table.

* * * * *